Oct. 27, 1925.

P. CLARK 1,558,839

MEANS FOR USE IN RAISING THE LIDS OF KETTLES AND LIKE VESSELS

Filed April 23, 1925

Inventor
Percy Clark,
By

Atty

Patented Oct. 27, 1925.

1,558,830

UNITED STATES PATENT OFFICE.

PERCY CLARK, OF MELBOURNE, VICTORIA, AUSTRALIA.

MEANS FOR USE IN RAISING THE LIDS OF KETTLES AND LIKE VESSELS.

Application filed April 23, 1925. Serial No. 25,352.

*To all whom it may concern:*

Be it known that I, PERCY CLARK, a subject of the King of Great Britain, residing at Melbourne, in the State of Victoria, Commonwealth of Australia, have invented certain new and useful Improvements in Means for use in Raising the Lids of Kettles and like Vessels, of which the following is a specification.

The present invention relates to means for use in raising the lid of a kettle or like vessel, and in which an upstanding bar or rigid link has one end attached to the lid, and the other loosely encircles the handle of the vessel and is free to slide thereon whereby a tilting motion can be imparted to the lid to expose the lid aperture for filling the vessel.

In practice with a lid so arranged, if the sliding movement imparted by hand to the said bar or link is made to cause the lid to turn, the lid is liable to come out of registration with and fall away from the lid aperture thereby exposing the hand to the action of any heat vapour passing through the lid aperture.

By the present invention the sliding of the bar along the handle is positively maintained in proper alignment to prevent the lid turning as before stated.

According to this invention a freely sliding member is provided on the handle of the vessel which when slid rearwardly on said handle causes the link to slide correctly along said handle without setting up any turning movement.

Further, when the link is in its rearmost position, with the lid fully tilted, it is held between said sliding member, and the rear downturned end member of the handle of the vessel whereby any further movement of the lid is prevented which would cause same to free itself from registration with the lid aperture in the body of the vessel. Furthermore, in order to positively prevent tilting movement of the lid, the sliding member is adapted to engage notches provided on the handle.

The invention is illustrated by the accompanying drawings whereof—

Figure 1:
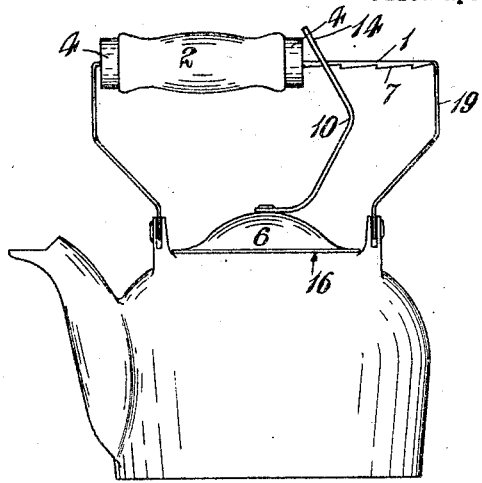

Figure 1 is a side elevation of a kettle, and

Figure 2:
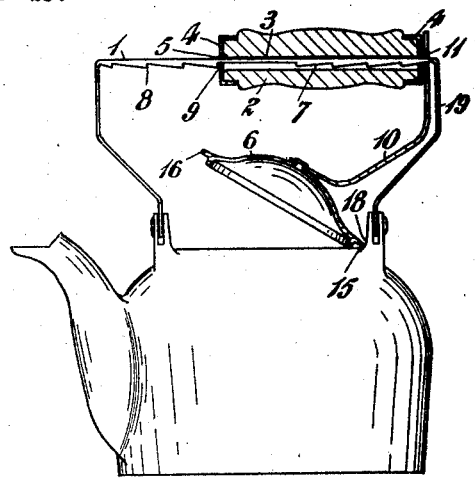

Figure 2 a similar view partly in section showing the lid in open position.

Figure 3:
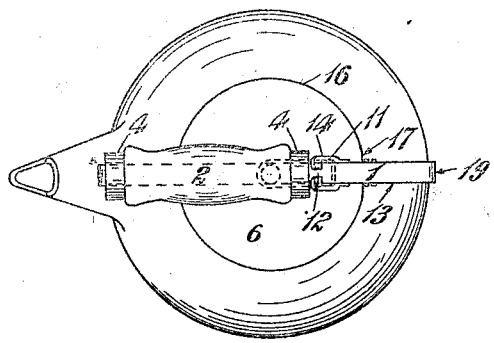

Figure 3 is a plan of Figure 1, and

Figure 4:
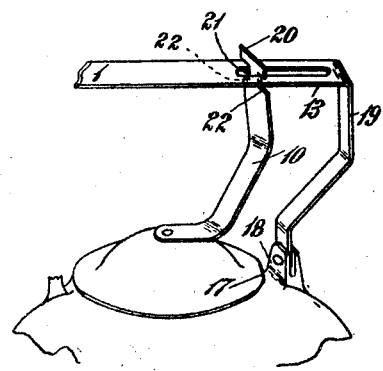

Figure 4 a perspective view of parts illustrating a slight variation in construction.

According to the form of the invention illustrated in Figures 1—3 the handle 1 of the vessel is constituted of flat section metal, and the sleeve or sliding member 2 consists of an appropriate length of non-conducting material as for instance, a sleeve of wood formed with a longitudinally aperture 3 through which said handle 1 is passed before being fixed in position, said aperture being of sufficient depth to permit a vertical movement of the sleeve member 2. Each end of said sliding member 2 is fitted with a metal ferrule 4 having a through aperture 5 of sufficient depth to permit a limited vertical movement of said sliding member, i. e., the depth of the aperture is approximately twice that of the thickness of the handle 1.

Means are provided to prevent said handle sliding forwardly through said sliding member 2 when the vessel is raised and tilted by grasping said member, as when pouring out the contents through the spout or alternatively to prevent said handle sliding backwardly when the lid 6 is raised as when the vessel is being filled. Such means consist of a ratchet shaped notch, but preferably two series of oppositely constructed ratchet shaped notches 7, 8 provided preferably on the underside of the handle 1 said notches permitting the sliding member to pass over same when said member is not lifted in relation to the handle by the hand.

When the vessel is raised the lower edge 9 of an aperture 5 in one ferrule engages the adjacent notch of the series 7 or 8 according to the inclination of the vessel. If the notches are on the upper side of the handle the sliding member is first raised before being slid along the handle.

The link 10 is curved backwardly as shown and fixed at its lower end to the top of the lid 6, and its upper end 14 is formed with a rectangular opening 11, the sides of which freely embrace the handle 1 behind the rear end of the sliding member. To permit the lid 6 being detached from the handle the opening 11 connects with a narrow slot 12 in the upper end of said link so that, by lifting the lid and swinging it upwardly said slot 12 is brought coincident with the edge 13 of the handle 1.

When it is desired to lift the lid 6 the sliding member 2 is slid backwardly on the handle so that it contacts with the upper end 14 of the bar or link 10, and tilts the lid which fulcrums on the edge of the mouth 15 of the vessel and said link is held between the rear end of said member and the downturned end member 19 of the handle, and the sliding member 2 is prevented from sliding along the handle by a notch on the latter engaging the lower edge 9 of an aperture 5 in a ferrule 4 of said sliding member.

In order to prevent the lid swaying to one side or the other the otherwise circular flange 16 thereof is formed with a straight portion 17 at the back which portion contacts with the lug 18 on the vessel to which the rear end member 19 of the handle is riveted.

When the vessel is lifted as for instance to pour out its contents, the act of gripping the sliding member 2 lifts the latter slightly so that a notch on the handle engages with the lower edge 9 of one of the apertures of a ferrule 4 of the sleeve member, thus preventing said sliding member moving backwardly and tilting the lid into open position.

In the illustration shown in Figure 4 the link is formed at the upper end with a crosshead 20, a neck 21 and shoulders 22, and the handle is formed with a longitudinal slot 23. When the upper end of the link engages the handle the neck 21 extends through the slot 23 with the crosshead 20 above, and the shoulders 22 beneath the handle. The link is so connected by first swinging it into horizontal position. This form of the link prevents the lid swaying, especially if the flange of same is formed with a straight portion as 17.

It is to be understood that I do not confine myself to any particular material or form of the sliding member as same may be varied in practice and the essential feature of the invention resides in the provision of such a member which is slid by hand along the handle to operate the link which causes the lid of the vessel to tilt open.

I claim:—

1. A device for raising the lids of kettles, including a handle fastened to the kettle, a lid having an upstanding rigid link slidable on said handle, and a sliding member on the latter which controls the sliding of said link.

2. A device for raising the lids of kettles, including a handle fastened to the kettle, a lid having an upstanding rigid link slidable on said handle, a sliding member on the latter which controls the sliding of said link, and cooperative means on said handle and sliding member for controlling the latter.

3. A device for raising the lids of kettles, including a handle fastened to the kettle, a lid having an upstanding rigid link slidable on said handle, a sliding member on the latter which controls the sliding of said link, a notch on the handle, and a ferrule on the end of said member adapted to engage said notch.

4. A device for raising the lids of kettles, including a handle fastened to the kettle, a lid having an upstanding rigid link slidable on the handle, a sliding member on the latter which controls the sliding movement of said link, a series of ratchet shaped notches on the handle, and a ferrule on the end of said member formed with an aperture and adapted to engage the notches.

5. A device for raising the lids of kettles, including a handle fastened to the kettle, a lid having an upstanding rigid link slidable on the handle, a sliding member on the latter which controls the sliding movement of said link, two series of oppositely arranged ratched shaped notches on the underside of the handle, ferrules provided on the ends of said member having edges adapted to engage the ratchets.

6. A device for raising the lids of kettles, including a handle fastened to the kettle, a lid having an upstanding rigid link slidable on the handle, end ferrules formed with apertures, all of said apertures being of sufficient depth to permit a slight vertical movement of said member, and a series of ratchet shaped notches on the underside of said handle adapted to be engaged by the edges of the apertures in said ferrules.

Dated this twentieth day of March, 1925.

PERCY CLARK.